United States Patent [19]

Kurabayashi et al.

[11] Patent Number: 5,072,336

[45] Date of Patent: Dec. 10, 1991

[54] ELECTRICAL DOUBLE-LAYER CAPACITOR

[75] Inventors: Ken Kurabayashi, Chigasaki; Yoshinobu Tsuchiya, Fujisawa; Yoriaki Niida, Yamato, all of Japan

[73] Assignee: Isuzu Motors Limited, Tokyo, Japan

[21] Appl. No.: 559,341

[22] Filed: Jul. 30, 1990

[30] Foreign Application Priority Data

Aug. 30, 1989 [JP] Japan .................................. 1-224024

[51] Int. Cl.$^5$ ............................................. H01G 9/04
[52] U.S. Cl. ..................................................... 361/502
[58] Field of Search ........................ 361/502; 29/25.03

[56] References Cited

U.S. PATENT DOCUMENTS 3,652,902  3/1972  Hart et al. ............................ 361/502

Primary Examiner—Donald A. Griffin
Attorney, Agent, or Firm—Spencer & Frank

[57] ABSTRACT

An electrical double-layer capacitor cell wherein a sintered polarizing electrode (2) is used as a polarizing electrode, and the collecting electrode (1) and the sintered polarizing electrode (2) are contacted. Conductive metal evaporated films (5,6) are formed on the respective contact surfaces of the collecting electrode (1) and of the sintered polarizing electrode (2). When the above-described contact is carried out by the respective conductive metal evaporated films (5,6), the contact resistance becomes small.

2 Claims, 1 Drawing Sheet

ELECTRICAL DOUBLE-LAYER CAPACITOR

DESCRIPTION

1. Technical Field

The present invention relates to an electrical double-layer capacitor wherein the contact resistance between the collecting electrode and the sintered polarizing electrode has been made small.

2. Background Art

A conventional electrical double-layer capacitor cell is shown in FIG. 4. In FIG. 4, numeral 1 denotes a collecting electrode, 2 a sintered polarizing electrode, 3 a separator, 4 a gasket, and A the contact surface of the collector electrode 1 and the sintered polarizing electrode 2.

The collector electrode 1 is made, for example, of a conductive rubber sheet, and the gasket 4 is made, for example, of non-conductive rubber. Also, the separator 3 is made, for example, of a polypropylene porous film.

The sintered polarizing electrode 2 is one which is made of active carbon particles formed in a solid plate-like shape and impregnated with an electrolytic liquid (example, dilute sulfuric acid). Although it is known that an electrode which is made in a paste-like form by mixing active carbon particles and the electrolytic liquid can be used as the polarizing electrode of an electrical double-layer capacitor cell, the present invention relates to an electrical double-layer capacitor cell using a polarizing electrode made into a solid plate-like shape by sintering in such a manner as described above.

The gasket 4 is made in a tube-like shape, and a separator 3 is arranged approximately at the center of the inside to delimit upper and lower parts. Then, at the respective upper and lower sides of the separator 3, the space within the gasket 4 is filled the respective sintered polarizing electrode 2, and a respective collecting electrode 1 is provided in such a manner that it covers the respective upper and lower surfaces of the respective sintered polarizing electrodes 2 and of the gasket 4.

The gasket 4 is adhered to the collecting electrodes 1 and the separator 3, and the collecting electrodes 1 are let contacted to the respective surfaces of the sintered polarizing electrodes 2. The above-described adhesion is carried out by the use of an adhesive agent or by the use of heat melting.

By the way, as the bibliography relating to an electrical double-layer capacitor cell, there are public reports such as the Japanese Patent Application Laid-Open No. 8753/1974 and No. 292612/1987.

Problem

However, in the known electrical double-layer capacitor cell using the above-described sintered polarizing electrodes 2, there is the problem that the contact resistance at the contact part or surface A between the collecting electrode 1 and the sintered polarizing electrode 2 does not become small.

Explanation of the Problem

When the surface of the sintered polarizing electrode 2 is microscopically seen, there is an uneven surface wherein active carbon particles are protruding at various points. On the other hand, the collecting electrode 1 is a rubber sheet wherein conductive particles are made contained.

In the case when both electrode members such as described above are brought into, the electrical resistance at the position where the convex part of active carbon particles of the sintered polarizing electrode 2 have luckily contacted the conductive particles of the collecting electrode 1 becomes small, but at the other part where such contact does not happen, the electrical resistance become large. Due to this fact, the contact resistance of the entire contact surface A can not be made small at any rate.

The present invention has the object of solving the problem as described above.

SUMMARY OF THE INVENTION

The object of the present invention is to diminish the resistance of the contact surface of the collecting electrode and the sintered polarizing electrode is an electrical double-layer capacitor cell.

In order to attain the above-described object, in the present invention, there is provided an electrical double-layer capacitor cell, in which the collecting electrode and the sintered polarizing electrode are contacted via conductive metallic evaporated films formed on respective surfaces of each of these electrodes.

These and other objects of the invention will become more apparent in the detailed description and examples which follow.

DETAILED DESCRIPTION OF THE PREFERRED EMBODIMENT

In the following, an embodiment of the present invention will be explained in detail by being based on drawings.

Figure 1:
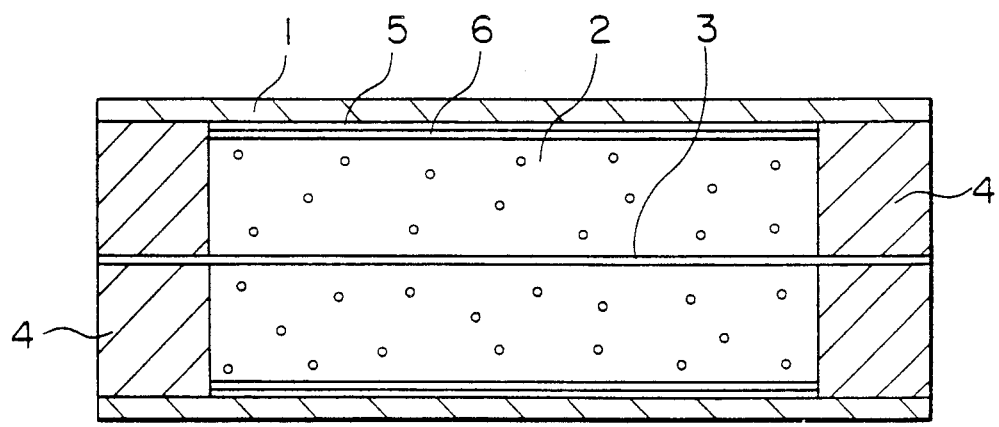
FIG. 1 is a diagram showing the electrical double-layer capacitor cell according to the embodiment of the present invention.
Figure 2:
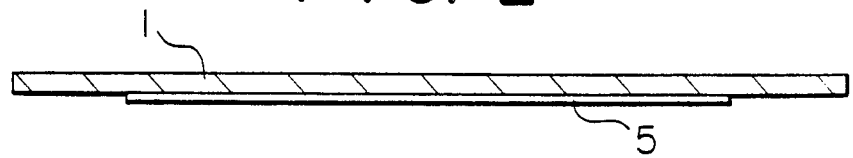
FIG. 2 is a diagram for showing the collecting electrode of FIG. 1 with an evaporated conductive metal film.
Figure 3:
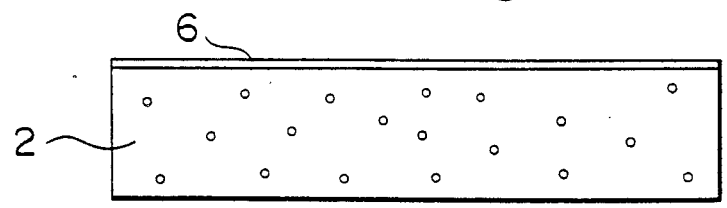
FIG. 3 is a diagram for showing a sintered polarizing electrode of FIG. 1 with an evaporated with a conductive metal film.
Figure 4:
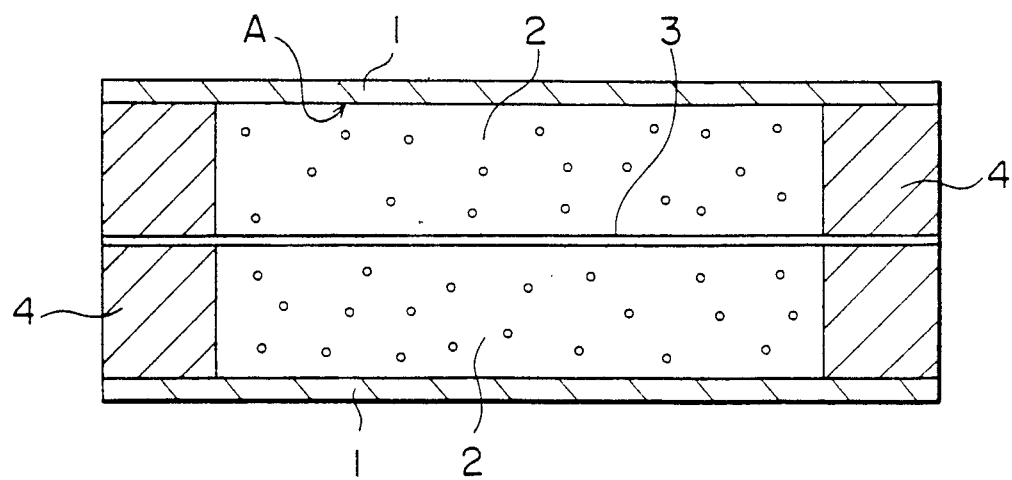
FIG. 4 is a diagram for showing a conventional electrical double-layer capacitor cell.

FIG. 1 shows an electrical double-layer capacitor cell according to the embodiment of the present invention. In FIGS. 1–3 reference numerals corresponding to those of FIG. 4 are used for like parts. Numeral 5 denotes a conductive metallic evaporated film formed on the inner surface of the collecting electrode 1, and 6 a conductive metallic evaporated film formed on the inner surface of the sintered polarizing electrode 2.

As the conductive metal to be evaporated, metals such as gold (Au), silver (Ag), platinum (Pt), copper (Cu), nickel (Ni), etc., can be used. The evaporation is carried out by use of a vacuum evaporation equipment. The metal to be evaporated is put on a evaporating source filament or in a boat, and evaporation is carried out in an atmosphere of the vacuum degree of $5 \times 10^{-4}$ to $5 \times 10^{-5}$ mm Hg. By the way, the evaporated film may be formed only on the part where the collecting electrode 1 and the sintered polarizing electrode 2 are mutually contacted.

Since the conductive metallic evaporated film 5 adheres to the active carbon particles of the surface of the collecting electrode 1 solidly, the electrical resistance between the active carbon particles and the conductive metal evaporated film 5 is negligibly small. The electrical resistance between the conductive particles on the surface of the sintered polarizing electrode 2 and the conductive metal evaporated film 6 is also small similarly. Also, the surfaces of the conductive metal evaporated films 5 and 6 are generally smooth.

As a result of the fact that the conductive metal evaporated film has been formed in such a manner as described above, the collecting electrode 1 and the sintered polarizing electrode 2 are caused to have a smooth and uniformly extended conductive metal film on the surface of the contact part thereof. Since the contact of the collecting electrode 1 and the sintered polarizing electrode 2 is carried out by the conductive metal films 5 and 6 with each other, the contact resistance becomes extremely small.

Although the invention has been described in its preferred form with a certain degree of particularity, it is understood that the present disclosure of the preferred form has been changed in the details of construction and the combination and arranged of parts may be resorted to without departing from the spirit and the scope of the invention as hereinafter claimed.

We claim:

1. An electrical double-layer capacitor wherein a collecting electrode and a sintered polarizing electrode contact one another via respective conductive metal evaporated films formed on respective facing surfaces of each of said electrodes.

2. In an electrical double-layer capacitor including first and second plate-like sintered polarizing electrodes disposed opposite one another on opposite sides of a separator, and first and second collecting electrodes for electricity contacting respective outer surfaces of said first and second polarizing electrodes; the improvement wherein:

a respective first evaporated conductive metal film is formed on said outer surface of each of said first and second polarizing electrodes;

a respective second evaporated conductive metal film is formed on said inner surface of each of said first and second collecting electrode; and said first and second metal films of said first polarizing and collecting electrodes and said first and second metal films of said second polarizing and collecting electrodes respectively contact one another to provide said electrical contacting between said polarizing and said collecting electrodes.

* * * * *